US012233295B2

(12) United States Patent
Wang et al.

(10) Patent No.: US 12,233,295 B2
(45) Date of Patent: Feb. 25, 2025

(54) SAFETY DEVICE CONNECTOR APPARATUS FOR USE WITH A WEARABLE SAFETY HARNESS

(71) Applicant: HONEYWELL INTERNATIONAL INC., Charlotte, NC (US)

(72) Inventors: Wenbo Wang, Charlotte, NC (US); Peng Zhou, Charlotte, NC (US); Ling Lin, Charlotte, NC (US); Zheng Gu, Charlotte, NC (US); Xiaojuan Zhu, Charlotte, NC (US); Lyndon Liu, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 29 days.

(21) Appl. No.: 17/931,749

(22) Filed: Sep. 13, 2022

(65) Prior Publication Data

US 2023/0094364 A1 Mar. 30, 2023

(30) Foreign Application Priority Data

Sep. 27, 2021 (CN) ......................... 202111136556.X

(51) Int. Cl.
*A62B 35/00* (2006.01)
*A62B 35/04* (2006.01)

(52) U.S. Cl.
CPC .......... *A62B 35/0037* (2013.01); *A62B 35/04* (2013.01); *Y10T 24/44274* (2015.01)

(58) Field of Classification Search
CPC ... A62B 35/0037; A62B 35/04; F16G 11/108; Y10T 24/44274; Y10T 24/44889
See application file for complete search history.

(56) References Cited

U.S. PATENT DOCUMENTS 3,757,901 A * 9/1973 Hobbs ...................... A62B 1/14 182/5
4,019,609 A * 4/1977 Wagner .................. A62B 35/04 182/5

(Continued)

FOREIGN PATENT DOCUMENTS

WO 2013/063384 A2 5/2013
WO 2019/012468 A1 1/2019

OTHER PUBLICATIONS

Extended European Search Report for EP Application No. 22195305.2 mailed Jan. 31, 2023 (7 pages).

(Continued)

*Primary Examiner* — Robert Sandy
*Assistant Examiner* — Rowland Do
(74) *Attorney, Agent, or Firm* — Alston & Bird LLP

(57) ABSTRACT

Various embodiments are directed to safety device connector apparatuses for use with a wearable safety harness. A safety device connector apparatus may comprise a base portion operable to attach to a strap of the wearable safety harness, the base portion comprising a base attachment pin fixedly secured thereto; a connector element configured to be detachably coupled to the base portion via a connector element detachable base interface comprising a connector interface opening and configured to engage the base attachment pin, wherein engaging the base attachment pin comprises receiving the base attachment pin within the connector interface opening; wherein the connector interface opening comprises an angled notch configuration configured to facilitate a movement of the base attachment pin relative to the connector interface opening; and wherein the connector element is configured to detach from the base portion based at least in part on a load force acting on the connector element.

10 Claims, 9 Drawing Sheets

(56) References Cited

U.S. PATENT DOCUMENTS

| | | | | | |
|---|---|---|---|---|---|
| 4,887,324 | A * | 12/1989 | Cairns | A47K 3/38 | 160/349.2 |
| 5,634,480 | A * | 6/1997 | Lu | A45D 8/26 | 132/275 |
| 6,675,449 | B2 * | 1/2004 | Wales | A44B 99/00 | 24/546 |
| 2019/0168032 | A1 * | 6/2019 | Hsu | A62B 35/0075 | |
| 2020/0129790 | A1 * | 4/2020 | Stephenson | A62B 35/0025 | |

OTHER PUBLICATIONS

CA Office Action Mailed on Nov. 21, 2023 for CA Application No. 3172708, 3 page(s).

* cited by examiner

SAFETY DEVICE CONNECTOR APPARATUS FOR USE WITH A WEARABLE SAFETY HARNESS

CROSS-REFERENCE TO RELATED APPLICATIONS

This application claims priority pursuant to 35 U.S.C. 119(a) to Chinese Application No. 202111136556.X, filed Sep. 27, 2021, which application is incorporated herein by reference in its entirety.

FIELD OF THE INVENTION

Various embodiments described herein relate generally to safety equipment or personal protective equipment (PPE), including full body harnesses, which may be used by first responders, other users who work on platforms situated at a height, and/or the like.

BACKGROUND

Safety harnesses are commonly used as part of a fall protection system for users subjected to the potential of a fall from a height. In some environments, full-body safety harnesses are used, in some examples, when working on platform including an elevated surface positioned at a height of six feet or greater. Wearable safety harnesses including a plurality of straps that collectively define both an upper torso portion (having, for example, shoulder straps) and a lower torso or seat portion (having, for example, one or more leg straps and/or a seat strap) may be secured to one or more safety system components in order to at least partially mitigate the bodily harm realized by a user as a result of a fall occurrence. Various PPE may be secured relative to a harness in order to operably couple a user of the harness relative to one or more anchor points. Installation of the PPE relative to the harness may be both difficult and time-consuming. For example, PPE may be secured relative to a harness using a single-use coupling component or various fastening means defined by rigid designs that can become increasingly difficult to operate over time or in various undesirable working conditions. In addition, upon a PPE component being secured relative to the harness and as the user moves about the elevated surface, the configuration of the plurality of straps defining the harness and any PPE operatively secured relative to the harness may intersect, tangle, rub, or otherwise hinder movement of a user. In the event of a fall, safety harnesses and various fastening means and PPE attached thereto can cause bodily harm to a user in the course of suspending the user or transmitting violent forces resulting from the harness or PPE being caught or snagged within the user's environment during the fall. Such harm can include severe physical trauma, such as loss of circulation of blood to a portion of the user's body (e.g., due to a constriction of the straps of the harness against the user's body), resulting in unconsciousness, serious injury, and possibly death.

Accordingly, a need exists for improved wearable harnesses, including improved connector elements characterized by increased ease of use, increased capacity to mitigate physical trauma realized by a user during a fall condition, increased mobility and user accessibility, minimized product costs, minimized product failure caused by wear and/or damage, and a maximization of product operability over the life of the product. Through applied effort, ingenuity, and innovation, Applicant has solved many of these identified problems by developing solutions embodied in the present disclosure, which are described in detail below.

BRIEF SUMMARY

Various embodiments are directed to safety device connector apparatuses for use with a wearable safety harness and methods of using the same. In various embodiments, a safety device connector apparatus may comprise a base portion operable to attach to one or more straps of the wearable safety harness, the base portion comprising a base attachment pin fixedly secured thereto; a connector element configured to be detachably coupled to the base portion via a connector element detachable base interface configured to engage the base attachment pin, wherein the connector element detachable base interface comprises a connector interface opening, and wherein engaging the base attachment pin comprises receiving at least a portion of the base attachment pin within the connector interface opening; wherein the connector interface opening comprises an angled notch configuration configured to facilitate a movement of at least a portion of the base attachment pin relative to the connector interface opening; and wherein at least a portion of the connector element is configured to detach from the base portion based at least in part on a load force acting on at least a portion of the connector element.

In various embodiments, the angled notch configuration of the connector interface opening may comprise a "V"-shaped notch. In various embodiments, the connector element may be configured to fully detach from the base portion based at least in part on the load force acting on the at least a portion of the connector element. In various embodiments, the connector element may comprise a first connector element portion fixedly secured to the base portion and a second connector element portion configured to detach from the base portion based at least in part on the load force acting on the at least a portion of the connector element. In certain embodiments, the second connector element portion may comprise the connector element detachable base interface. Further, in certain embodiments, the connector element comprises a connector arm that extends along an arm length between a first arm end and a second arm end, the first arm end comprising the first connector element portion and the second arm end comprising the second connector element portion; wherein the first arm end is fixedly secured to the base portion along an at least partially linear axis; and wherein the connector element defines a hinged connection relative to the base portion wherein the second arm end is configured to rotate about the at least partially linear axis relative to the base portion.

In various embodiments, the connector element detachable base interface may be coupled to the base attachment pin via a hinged connection such that the connector element is configured to rotate about a central axis of the base attachment pin relative to the base portion. In various embodiments, the at least a portion of the connector element detaching from the base portion may comprise the connector element detachable base interface disengaging the base attachment pin; wherein a reconfiguration of the connector element from an engaged position to a disengaged position is defined at least in part by the connector element detachable base interface disengaging the base attachment pin. In certain embodiments, the disengaged position of the connector element may correspond to a configuration that enables a safety device coupled to the apparatus so as to be secured relative to the base portion to be released relative to the base portion. In various embodiments, the connector element may be predisposed to being arranged in an engaged position wherein the connector element detachable base interface is engaged with the base attachment pin. In certain embodiments, the connector element may be predisposed to being arranged in the engaged position based at least in part on the connector element having an at least partially elastic configuration.

In various embodiments, at least a portion of the load force acting on the at least a portion of the connector element may be transmitted to the at least a portion of the connector element by a safety device coupled to the apparatus. In certain embodiments, the safety device may be coupled to the apparatus at a safety device attachment interface, wherein the safety device attachment interface is defined by a channel extending laterally along a width portion of the base portion between the base portion and the connector element, the channel being configured to receive at least a portion of the safety device therein. In various embodiments, the angled notch configuration of the connector interface opening may be defined at least in part by a notch angle that is larger than a connector interface opening angle defined at least in part by a radial height of the connector interface opening. In various embodiments, the base attachment pin may comprise a cylindrical protrusion portion that extends laterally along a first width portion of the base portion; where in the cylindrical protrusion portion is positioned at a perpendicular distance away from a base surface of the base portion.

In various embodiments, the connector element detachable base interface may comprise cylindrical sidewall extending along a central axis so as to at least partially surround a connector interface channel defined within the cylindrical sidewall; wherein the connector interface opening extends through a thickness of the cylindrical sidewall such that the connector element detachable base interface is configured to receive at least a portion of the base attachment pin within the connector interface channel via the connector interface opening. In certain embodiments, the connector interface channel may extend in a lateral direction that is at least substantially parallel to a width direction of the base attachment pin. In certain embodiments, the connector element detachable base interface may be configured to secure at least a portion of the base attachment pin within the connector interface channel base at least in part on a physical engagement between an interior surface of the cylindrical sidewall and the at least a portion of the base attachment pin. In various embodiments, the connector element detachable base interface may be configured to secure at least a portion of the base attachment pin within the connector interface channel base at least in part on a physical engagement between an interior surface of the cylindrical sidewall and the at least a portion of the base attachment pin. Further, in certain embodiments, the connector interface opening may be defined at least in part by a linear opening distance corresponding to a linear height of the connector interface opening; wherein the linear opening distance of the connector interface opening is at least substantially less than a corresponding linear height of the base attachment pin.

BRIEF DESCRIPTION OF THE DRAWINGS

Reference will now be made to the accompanying drawings, which are not necessarily drawn to scale, and wherein.

DETAILED DESCRIPTION

Figure 1:
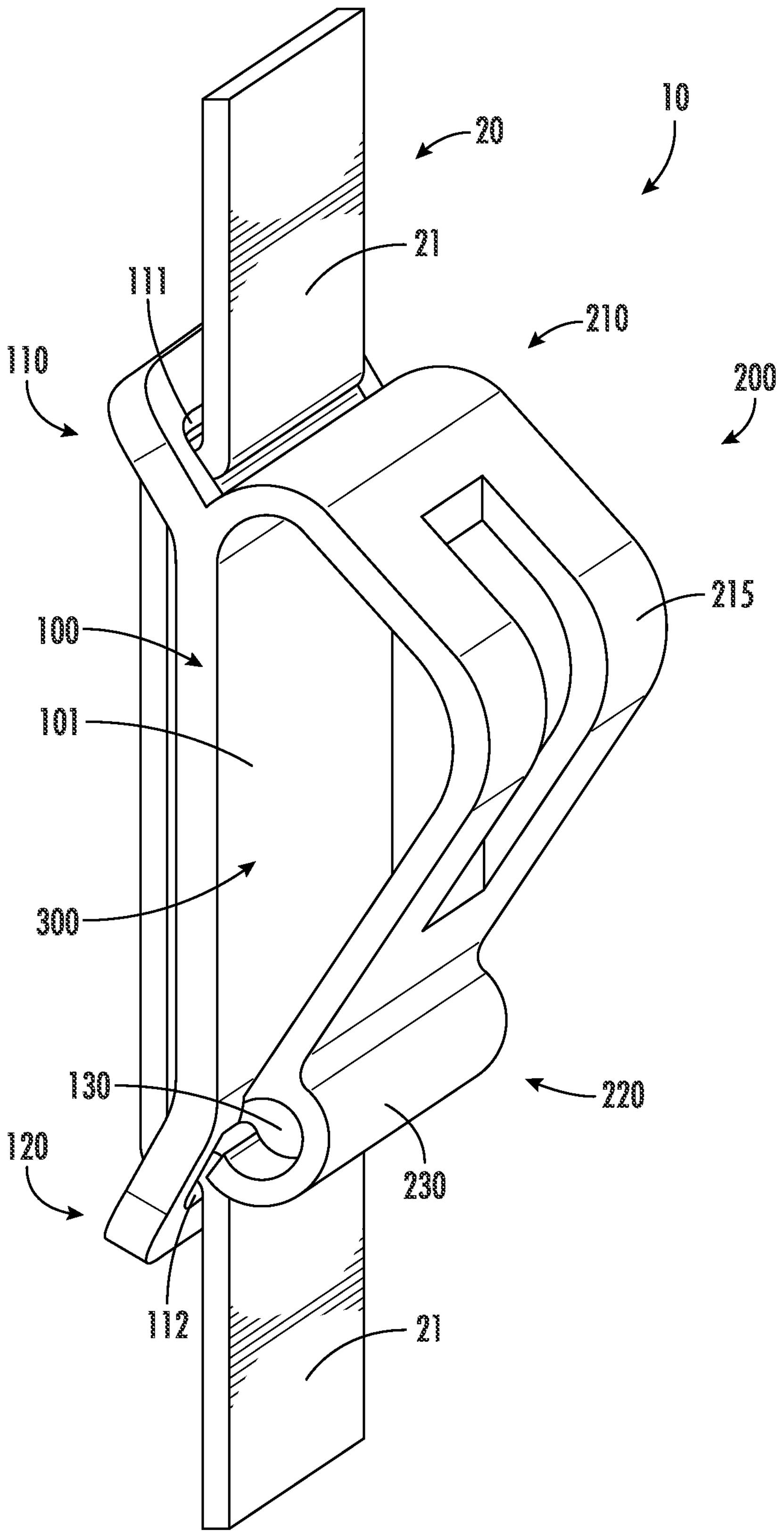
FIG. 1 illustrates a perspective view of a safety device connector apparatus according to an example embodiment described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words “example,” or “exemplary,” when used herein, are intended to mean “serving as an example, instance, or illustration.” Any implementation described herein as an “example” or “exemplary embodiment” is not necessarily preferred or advantageous over other implementations.

The term “strap” refers to an elongated flap or a flat strip comprising a material having flexibility characteristics. Example material may include, but not limited to, nylon, polyester, synthetic fiber, and/or the like. In some examples, an example strap may connect, fasten, and/or secure various parts of an example harness, and/or may support body portion(s) of a wearer of the example harness. In some examples, an example strap of an example harness may be referred to in connection with an example placement of the strap when the example harness is worn by a user. For example, an example leg strap of an example harness may be placed on a leg portion of a wearer of the example harness.

In various embodiments, the disclosed relief apparatus is configured for use with a full-body harness and a user of the full-body harness. Full-body harness, safety harnesses, harnesses, suspension devices, suspension systems, and/or similar terms used herein interchangeably are configured to protect a user from falls from dangerous heights. Typically, a harness is connected via a line to a secure point at or above a height at which the user is positioned, and in the event of a fall, tension of the line suspends the harness and the user in mid-air. Various harnesses are composed of various straps arranged and positioned in various configurations to secure and wrap around a user's body. Specifically, various harnesses may include an upper body portion and a lower body portion, where an upper body portion may include straps wrapped around a user's chest, shoulders, arms, and/or back while a lower body portion may include straps wrapped around a user's waist, hips, groin, pelvic region, legs, and/or the like.

Various embodiments described herein are directed to a safety device connector apparatus configured to be at least partially relative to secured to a wearable harness via one or more straps of the wearable harness. As described herein, the safety device connector apparatus may comprise a base portion configured to be secured relative to a strap (e.g., webbing) of a harness so as to retain at least a portion of the safety device connector apparatus secured in a position along the length of the strap. In various embodiments, the safety device connector apparatus may be defined at least in part by a specifically configured connector element, including a safety device attachment interface that is configured to be engaged by a safety device such as, for example, a fall protection lanyard, a D-ring, an anchor, a self-retracting lifeline (SRL), a personal fall limitor (PFL), a carabiner, and/or the like, so as to operatively couple the safety device to the harness via the safety device connector apparatus secured thereto. As described herein, at least a portion of the connector element may be detachable from the base portion such that, in the event of wearable harness experiencing a fall condition in which a lanyard leg and/or safety device engaged with the apparatus gets caught, tangled, tied, snagged and/or otherwise forcefully pulled, a resultant load force may cause the connector element to at least partially disengage the base portion so as to prevent the tightening forces from transferring to the harness and causing further physical trauma. Further, the present invention may include a connector element comprising an angled notched configuration that facilitates ease of use during operation of the apparatus by at least substantially reducing various resistance forces that may be generated by physical component interference during operation of the apparatus, such as, for example, during anchoring, re-assembly, selective engagement, and/or safety device coupling operations. For example, in various embodiments, the angled notch configuration of the connector interface opening provided within the connector element may comprise a "V"-shaped notch configured to enable repeatable operation of a safety device connector apparatus defined by an at least substantially reduced physical exertion required for operation.

FIG. 1 illustrates a perspective view of an exemplary safety device connector apparatus according to various embodiments described herein. In particular, FIG. 1 illustrates a perspective view of an exemplary safety device connector apparatus 10 secured relative to wearable safety harness 20 (e.g., a strap 21 of the wearable safety harness 20) and configured to receive and/or be engaged by a safety device so as to facilitate an operative coupling of at least a portion of the safety device relative to the wearable safety harness 20. In various embodiments, an item of personal protective equipment (PPE) for providing fall protection is shown as a piece of fall protection equipment (FPE) in the form of a wearable safety harness for use in fall protection, such as, for example, a wearable safety harness 20. In various embodiments, a wearable safety harness 20 may comprise a full-body safety harness configured to be worn by a user. For example, an exemplary wearable safety harness 20 may be a full-body harness comprising a plurality of straps 21 configured to secure a user within the harness 20, such as, for example, by attaching the harness 20 to the user, and, further, to facilitate an attachment of the wearable safety harness 20 to other fall protection equipment. In various embodiments, the wearable safety harness 20 may be configured for coupling to one or more safety devices, such as, for example, a fall protection device, configured to at least substantially mitigate and/or minimize bodily harm realized by a user in the event of a fall, as described herein. As non-limiting examples provided for purposed of illustration, in various embodiments, a safety device may be a D-ring, an anchor, a fall protection lanyard, a self-retracting lifeline (SRL), a personal fall limitor (PFL), a carabiner, and/or the like that may be secured relative to at least a portion of a wearable safety harness 20. It should be understood that many types and configurations of safety/fall harnesses are known in the PPE and FPE industry, including full body harnesses and partial or hip/waist fall harnesses, all, or most, of which are suitable for use with the concepts disclosed herein. Accordingly, the wearable safety harness 20 depicted in FIG. 1 is provided for purposes of illustration and further specific details of the harness 20 will not be discussed herein except for those required for an understanding of the disclosed concepts, and that the appended claims are not limited to any specific details of a fall harness unless expressly recited in the claims.

In various embodiments, a safety device connector element 10 may comprise a base portion 100 and a connector element 200. In various embodiments, base portion 100 may be configured to engage one or more straps 21 (e.g., webbing (s)) of a harness 20 in order to secure at least a portion of the safety device connector apparatus 10 to the one or more straps 21. For example, the base portion 100 of the safety device connector apparatus 10 may embody a baseplate having a length that extends between a first base end 110 and a second base end 120, such as, for example. along a length of a strap 21 to which the base portion is secured. In various embodiments, the base portion 100 may be operable to attach to at least a portion of a wearable safety harness, such as, for example, via a secured arrangement of at least one of the plurality of straps 21 through one or more of the base openings 101 extending through a thickness of the base portion 100. For example, as illustrated, an example base portion 100 may comprise a plurality of base openings, including a first base opening 111 arranged at least substantially adjacent a first base end 110 and a second base opening 112 arranged at an opposing end of the length of the base portion 100 at least substantially adjacent the second base end 120, each of which may be configured to receive at least a portion of a strap 21 therethrough.

In various embodiments, the base element 100 of an exemplary safety device connector apparatus 10 may comprise a base attachment pin 130 disposed about a surface 101 of the base portion 100 so as extend in an outward direction away from the surface 101. In various embodiments, the base attachment pin 130 may comprise a protrusion configured to protrude in an outward direction away from the surface 101 such that the base attachment pin 130 may be physically engaged by a connector element detachable base interface 230, as described herein, to facilitate a configuration of the connector element 200 in an engaged position. In various embodiments, the base attachment pin 130 may comprise an at least substantially linear protrusion that is rigidly secured to the base portion 100 (e.g., at surface 101) and extends laterally along at least a portion of the width of the base portion 100 at least partially between opposing lateral sides of the base portion 100 (e.g., in a lateral direction). In various embodiments, as described herein, the base attachment element 130 may comprise a planar protrusion portion extending from the base portion 100 away from the surface 101 and a cylindrical pin portion rigidly secured to the outermost edge of the planar protrusion portion and extending in a lateral direction parallel to the planar protrusion portion, such that the cylindrical pin portion is positioned along the width of the base portion 100 at a distance away from the surface 101. In such an exemplary circumstance, the base attachment pin 130 is configured such that the physical engagement of the connector element detachable base interface 230 and the base attachment pin 130 is initiated by the connector element detachable base interface 230 physically abutting the cylindrical pin portion of the base attachment pin 130. As described in further detail herein, the cross-sectional configuration of the base attachment pin 130 may correspond at least in part to the cross-sectional configuration of the connector element detachable base interface 230 of the connector element 200 in order to facilitate the detachable configuration of the connector element 200 relative to the base portion 100.

In various embodiments, the safety device connector apparatus 10 may further comprise a connector element 200 configured to receive and/or engage at least a portion of a safety device in order to facilitate attachment of the safety device to the safety device connector apparatus 10, as described in further detail herein. For example, the connector element 200 of the safety device connector apparatus 10 may be configured to enable an operable coupling of the safety device engaged therewith relative to the wearable safety harness 20 (e.g., via the safety device connector apparatus 10 secured to at least one strap 21). As described herein, in various embodiments, the connector element 200 may be configured to have an at least partially detachable configuration relative to the base portion 100 of the safety device connector apparatus 10. For example, the safety device connector apparatus 10 may comprise a connector element 200 that is configurable between an engaged position and a disengaged position based at least in part on the detachable configuration of at least a portion of a connector element 200 relative to the base portion 100, as described herein.

As illustrated in FIGS. 1-4, a connector device 200 of an exemplary safety device connector apparatus 10 may comprise an arm element having a length that extends between a first arm end 210 and a second arm end 220. In such an exemplary circumstance, the first arm end 210 may be fixedly secured to the base portion 100, such as, for example, at least substantially adjacent the first base end 110. For example, as illustrated in FIGS. 1-4, the connector element 200 may comprise an arm element that has a width that is at least substantially similar to that of the base portion 100 and protrudes in an at least partially outward direction away from the portion of the strap 21 to which the base portion 100 (e.g., the first base orifice 111 at first base end 110) is engaged, such that the first arm end 210 of connector element 200 is fixedly secured to the first base end 110 along a lateral width of the base portion 100. Further, the second arm end 220 may be configured to be detachably secured to a portion of the base portion 100 arranged at least substantially adjacent the second base end 120, such as, for example, in a position at least substantially adjacent the second base end 120.

In various embodiments, a connector element 200 may comprise a connector element detachable base interface 230 configured to be detachably couplable to at least a portion of the base portion 100 (e.g., the base attachment pin 130) so as to enable the detachable configuration between the connector element 200 and the base portion 100 of the safety device connector apparatus 10. For example, in various embodiments, the connector element detachable base interface 230 may comprise a part of the connector element 200 that is defined at least in part by a fastening means that corresponds to the base attachment pin 130 of the base portion 100 such that the connector element 200 may be arranged in an engaged position based on the physical engagement between corresponding features of the connector element detachable base interface 230 and the base attachment pin 130. In various embodiments wherein connector element 200 comprises an arm element that has a first arm end 210 that is fixedly secured to the first base end 110 of the base portion 100, as illustrated in FIGS. 1-4, the second arm end 220 may be defined at least in part by the connector element detachable base interface 230 such that the connector element 200 may be configurable between an engaged position and a disengaged position based on the detachable configuration of the second arm end 220 (e.g., the connector element detachable base interface 230) relative to the base attachment pin 130 of the base portion 100, as described herein.

As illustrated, in various embodiments the connector element detachable base interface 230 may be a fastening means (e.g., a female fastening means) comprising an at least partially tubular component defined by an at least partially cylindrical exterior sidewall. In various embodiments, an at least partially cylindrical sidewall of the connector element detachable base interface 230 may be configured to define a connector interface channel embodying a hollow cylindrical channel that that extends along the central axis of the cylindrical sidewall. The connector element detachable base interface 230 may comprise a connector interface opening extending through the cylindrical sidewall that is configured to enable at least a portion of the base attachment pin 130 to be received within the connector interface channel via the connector interface opening. For example, a connector interface opening of the connector element detachable base interface 230 may be configured to receive at least a portion of a base attachment pin 130 therethrough so as to facilitate the connector element 200 being configured in an engaged position securing at least a portion of the base attachment pin 130 within the connector interface channel of the connector element detachable base interface 230.

An exemplary safety device connector apparatus 10 may comprise a base portion 100 with a base attachment pin 130 that embodies a male fastening component and a connector element 200 with a connector element detachable base interface 230 that embodies a corresponding female fastening component configured to receive the base attachment pin 130 to secure the connector element 200 in an engaged position relative to the base portion 100. The connector element detachable base interface 230 may be configured to at least partially restrict the range of motion of the base attachment pin 130 engaged therewith so as to secure the connector element 200 (e.g., a second arm end 220) to the base portion 100 via an at least temporary coupling of the connector element detachable base interface 230 to the base attachment pin 130. As described in further detail herein, the connector element detachable base interface 230 may be configured to disengage from a base attachment pin 130 engaged therewith based at least in part on a resultant force generated in response to a fall event that acts on the safety device 30 attached to the safety device connector apparatus

10 such that a threshold pulling force is transmitted to the connector element 200 (e.g., via the safety device 30 engaged therewith) and acts (e.g., pulls) on the connector element detachable base interface 230 of the connector element 200 in a direction at least substantially away from the base attachment pin 130 to initiate a reconfiguration of the connector element from an engaged position to a disengaged position.

As illustrated, the connector element 200 may comprise an at least partially curved profile defined at least in part by a radius of curvature that may vary at one or more locations along the length of the connector element 200 between the first arm end 210 and the second arm end 220. For example, the connector element 200 may comprise a radius of curvature 215 that is curved about a lateral axis such that in an exemplary configuration wherein the first arm end 210 and the second arm end 220 are secured at least substantially adjacent the base portion 100, each protruding in a respective at least partially outward direction (e.g., away from the portion of the strap 21 to which the base portion 100 is secured), the connector element 200 may maintain an at least substantially continuous length of material. In such an exemplary circumstance, the curved profile of the connector element 200 may be configured such that the connector element 200 and the base portion 100 of the safety device connector apparatus 10 may collectively define a channel provided therebetween that extends along the width of the safety device connector apparatus 10 (e.g., along the widths of the connector element 200 and the base portion 100) between opposing lateral sides of the safety device connector apparatus 10 (e.g., in a lateral direction). For example, the safety device connector apparatus 10 may be configured to receive at least a portion of a safety device within the channel defined between the connector element 200 and the base portion 100, as described in further detail herein.

Figure 2:
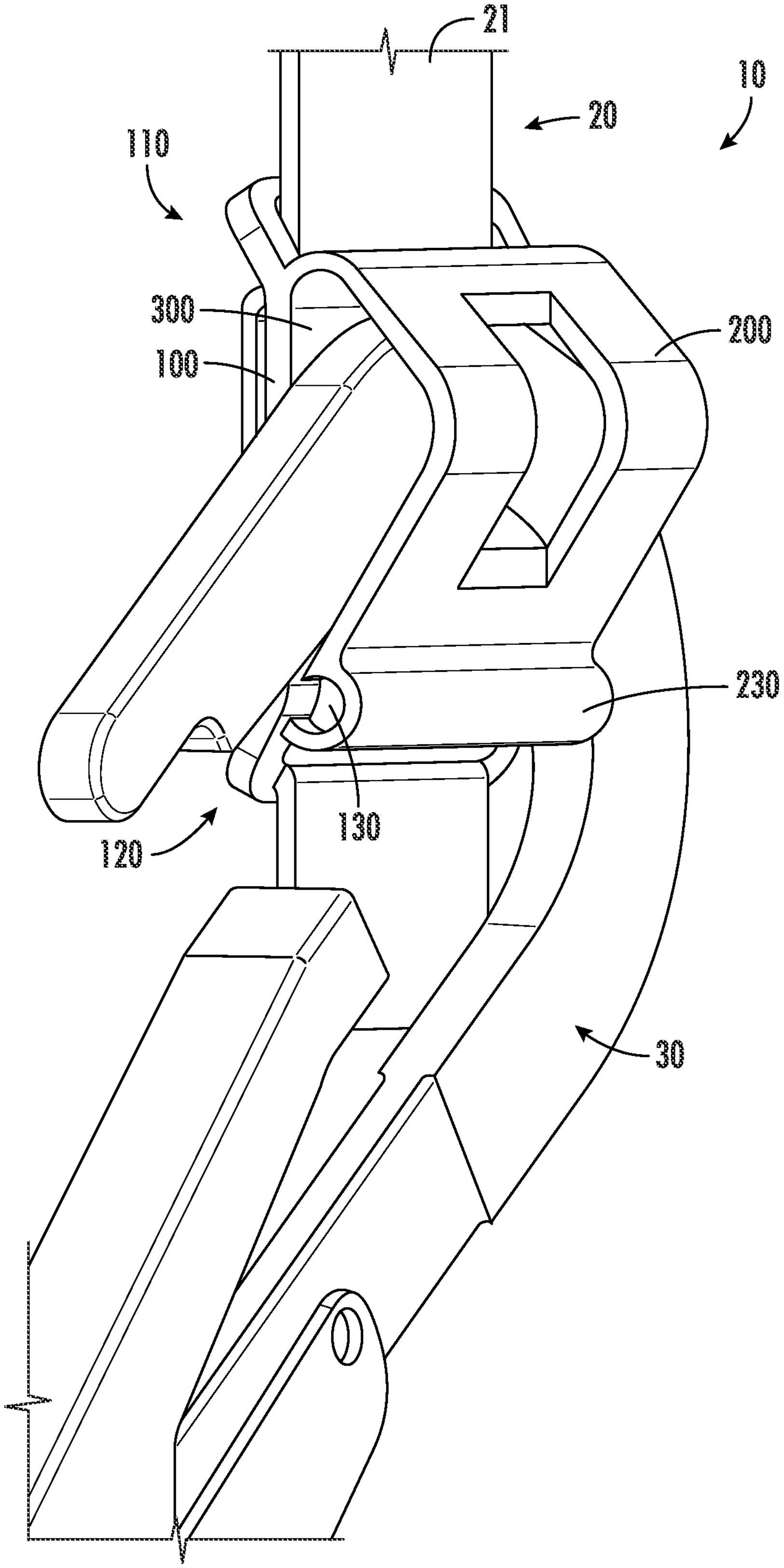
FIG. 2 illustrates a perspective view of a safety device secured to an exemplary safety device connector apparatus according to an example embodiment described herein.

In various embodiments, the safety device connector apparatus 10 may be configured to receive at least a portion of a safety device that is selectively attached to the safety device connector apparatus 10 via a safety device attachment interface 300 defined at least in part by the connector element 200. In various embodiments, a safety device attachment interface 300 may be embodied by an opening within which a fastening portion of a safety device, such as, for example, a hook, a ring element, and/or the like, may be received by the safety device connector apparatus 10 in order to retain the safety device an in installed configuration relative to a wearable harness 20. For example, as illustrated in FIG. 2, a safety device attachment interface 300 of the safety device connector apparatus 10 may comprise a channel provided between the base portion 100 and the connector element 200, as described herein. In such an exemplary embodiment, the safety device connector apparatus 10 may be configured such that at least a portion of a safety device 30 may be looped through the safety device attachment interface 300 (e.g., the channel collectively defined by the base portion 100 and the connector element 200) in order to attach the safety device 30 to the safety device connector apparatus 10. In such an exemplary circumstance, wherein the connector element is configured in an engaged position relative to the base portion 100, the safety device attachment interface 300 defined by the channel provided between the base portion 100 and the connector element 200 may be configured to retain the safety device 30 in an installed configuration relative to the safety device connector apparatus 10.

In various embodiments, the connector element 200 of the safety device connector apparatus 10 may comprise an at least partially detachable configuration relative to the base portion 100 such that the connector element 200 is configurable between an engaged position and a disengaged position. In various embodiments, an engaged position of an exemplary connector element 200 may be defined at least in part by a configuration wherein the connector element detachable base interface 230 is secured relative to the base attachment pin 130. As non-limiting examples described herein with reference to FIGS. 1 and 2, the exemplary safety device connector apparatus 10 is shown in FIGS. 1 and 2 in an engaged position. For example, in various embodiments, an engaged position may be defined by a configuration wherein the connector element 200 is secured relative to the base portion 100 such that a safety device 30 provided within the safety device attachment interface 300 of the safety device connector apparatus 10 may be retained in an installed configuration relative to the harness 20. As illustrated in FIGS. 1 and 2, wherein a connector element 200 comprises a partially detachable arm element, as described herein, the connector element 200 being configured in an engaged position may be defined at least in part by the connector element detachable base interface 230 being coupled to base attachment pin 130 such that the connector element 200 and the base portion 100 collectively define a continuous perimeter boundary that at least substantially surrounds an enclosed channel that embodies a safety device attachment interface 300 within which a portion of the safety device 30 may be received by the safety device connector apparatus 10 in order to secure the safety device 30 relative to the harness 20. In various embodiments, an engaged position of an exemplary connector element 200 may be defined at least in part by a configuration wherein the connector element detachable base interface 230 is secured relative to at least a portion of a strap 21 to which the safety device connector apparatus 10 is secured (e.g., via the base portion 100).

Further, in various embodiments, a disengaged position of an exemplary connector element 200 may be defined at least in part by a configuration wherein the connector element detachable base interface 230 is not engaged with the base attachment pin 130. For example, in various embodiments, a connector element 200 provided in a disengaged position may be either fully detached from the base portion 100 such that no portion of the connector element 200 is engaged with the base portion 100, or partially detached from the base portion 100 such that a first portion of the connector element 200 (e.g., a first arm end 210) remains fixedly secured relative to the base portion 100 while a second portion of the connector element 200 comprising the connector element detachable base interface 230 is disengaged from the base attachment pin 130.

Figure 3A:
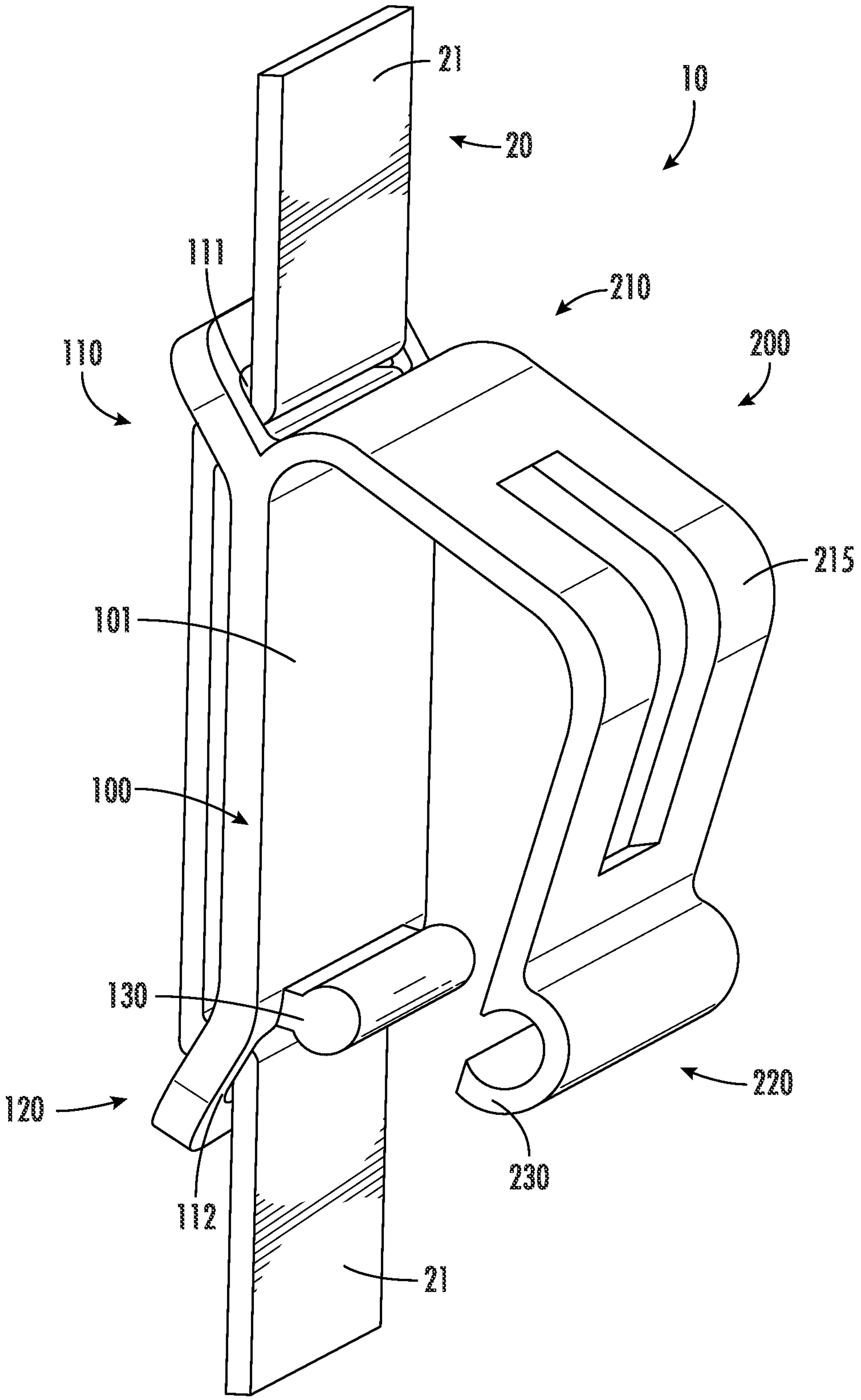
FIGS. 3A-3B illustrate various views of an exemplary safety device connector apparatus according to various embodiments described herein.
Figure 3B:
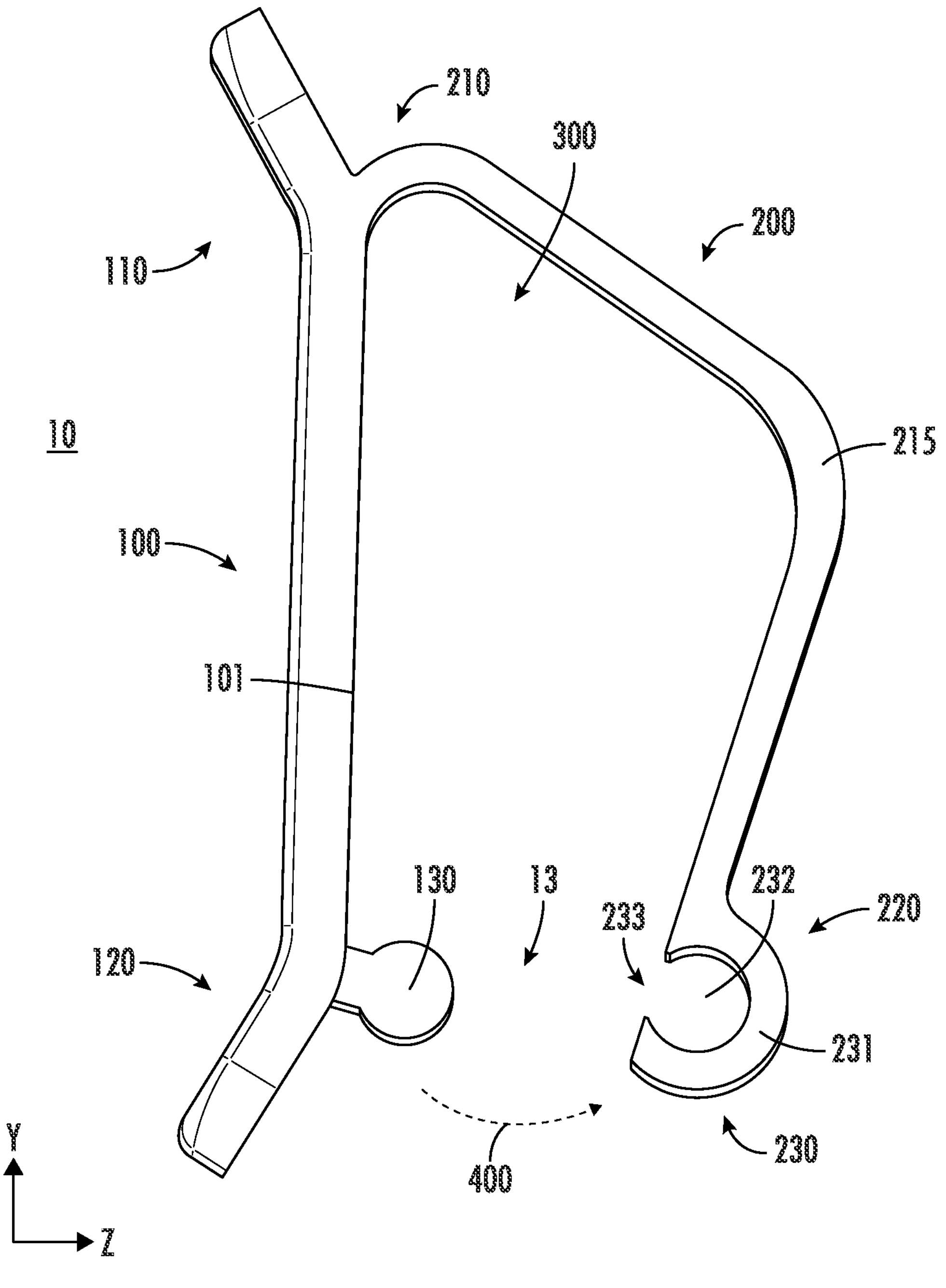

FIGS. 3A and 3B illustrate a perspective view and a side view, respectively, of exemplary safety device connector apparatuses according to various embodiments described herein. In particular, the exemplary safety device connector apparatuses 10 comprise connector elements 200 shown in a disengaged position. In various embodiments, a connector element 200 in a disengaged position may be at least partially detached (e.g., fully detached, attached at a first end and detached at a second end) from a base portion 100 of the safety device connector apparatus 10 may while the base portion 100 remains operatively secured to a strap 21 of a harness 20. As illustrated in FIGS. 3A and 3B, wherein the connector element 200 comprises a partially detachable arm element, as described herein, the connector element 200 being configured in a disengaged position may be defined at least in part by a connector element detachable base interface 230 at a second arm end 220 being disengaged from the base attachment pin 130 of the base portion 100 while the first arm end 210 remains fixedly secured to the base portion 100 at a first base end 110 thereof. In such an exemplary circumstance wherein the fixed connection of the first arm end 210 to the first base end 110 and the connector element detachable base interface 230 positioned at the second arm end 220 is disengaged from the base attachment point 130, the connector element 200 may comprise a hinged configuration such that the second arm end 220 (e.g., connector element detachable base interface 230) may rotate about a lateral hinge axis defined along the fixed connection between the first arm end 210 to the first base end 110.

As illustrated in FIG. 3B, at least a portion of an exemplary connector element 200 having a hinged configuration may be configured to rotate in a first rotational direction 400 (e.g., in a counter-clockwise direction about the lateral hinge axis extending along the attachment interface of the first arm end 210 to the first base end 110 relative to the orientation of FIG. 3B) as the connector element 200 is reconfigured from the engaged position to the illustrated disengaged position. For example, in various embodiments wherein the connector element 200 rotates in the first rotational direction to a disengaged position, the connector element detachable base interface 230 may be at least substantially separated from the base attachment pin 130 by a gap 13 that extends between the connector element detachable base interface 230 and the base attachment pin 130 in a direction perpendicular to the surface 101 of the base portion 100 (e.g., extending in a z-direction relative to the orientation of FIG. 3B). In such an exemplary circumstance, the safety device attachment interface 300 within which a safety device connector apparatus 10 with a connector element 200 configured in an engaged position may receive a safety device 30 may be at least partially opened via the gap 13 such that the safety device 30 previously retained within the safety device attachment interface 300 when the connector element 200 was configured in the engaged position may be detached, released, and/or otherwise decoupled from the safety device connector apparatus 10 through gap 13.

In various embodiments, an exemplary safety device connector apparatus 10 may be configured such that the connector element 200 thereof may be reconfigured from an engaged position to a disengaged position based at least in part on a load force acting on at least a portion of the connector element 200. In various embodiments, a load force that acts on the connector element 200 so as to cause at least a portion of the connector element 200 (e.g., a connector element detachable base interface 230) to detach from the base portion 100 (e.g., a base attachment pin 130) such that the connector element 200 is reconfigured from the engaged position to the disengaged position may be defined at least in part by a force generated as a result of the fall occurrence. In an exemplary circumstance wherein a safety device 30 is attached to a safety device connector apparatus 10 at a safety device attachment interface 300 defined at least in part by a connector element 200 configured in an engaged position such that the safety device 30 is operatively coupled to a wearable harness (e.g., via a strap 21), a fall condition experienced by the wearable harness may result in at least a portion of the safety device 30 exhibiting an at least partially restricted condition, such as, for example, wherein the safety device 30 getting caught, tangled, tied, snagged and/or otherwise forcefully pulled, such that a first pulling force is generated.

Figure 4:
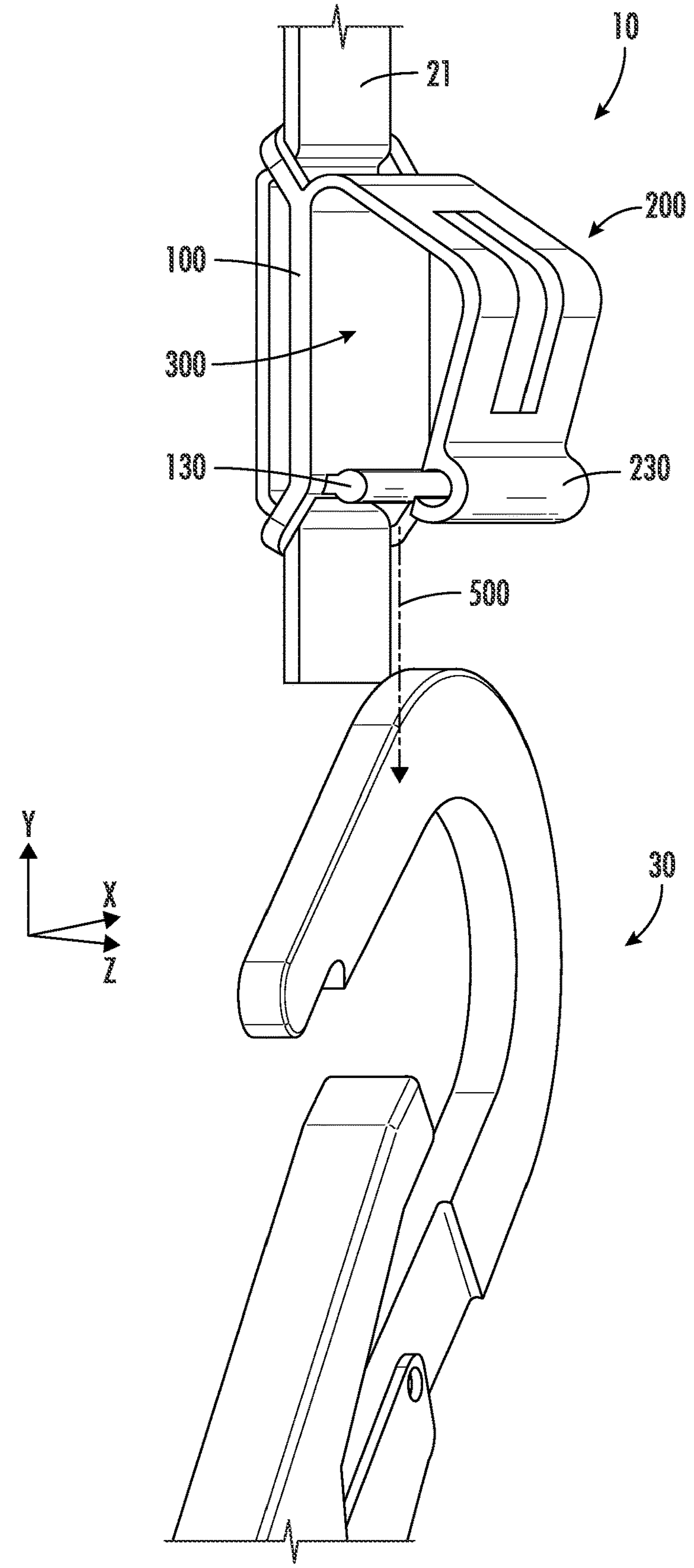
FIG. 4 illustrates an exemplary safety device connector apparatus according to an example embodiment described herein.

For example, FIG. 4 illustrates an exemplary safety device connector apparatus 10 comprising a connector element 200 configured in a disengaged position upon being reconfigured from an engaged position as a result of a load force caused by a pulling force acting on a safety device 30 that acts on the connector element 200. In various embodiments, a pulling force, such as, for example, a pulling force 500, that is generated by the wearable harness and/or the safety device 30 upon experiencing a fall condition may act (e.g., pull) on the portion of the safety device 30 secured within the safety device attachment interface 300 of the safety device connector element 10 in a direction at least substantially away from the safety device connector element 10 (e.g., in a negative-y direction relative to the orientation of FIG. 4). In such an exemplary circumstance, a pulling force 500 may cause the at least a portion of the safety device 30 to be pulled against the connector element 200 such that at least a portion of the pulling force 500 may be transmitted to the connector element 200 and realized at the connector element detachable base interface 230. In various embodiments, the at least a portion of the pulling force 500 transmitted to the connector element detachable base interface 230 may act on the connector element detachable base interface 230 in an at least partially outward direction away from the base portion 100 (e.g., away from the base attachment pin 130) so as to initiate the reconfiguration of the connector element 200 from the engaged position to a disengaged position.

In various embodiments, a connector element 200 may be configured to at least partially detach from the base portion 100 so as to be reconfigured to a disengaged position in response to a threshold load force acting on the connector element 200 (e.g., on a connector element detachable base interface 230) in an at least partially outward direction away from the base element 100 (e.g., the base attachment pin 130). For example, a connector element detachable base interface 230 may be configured to be caused to disengage from a base attachment pin 130 of the base portion 100 by a threshold load force generated upon at least a portion of a pulling force (e.g., pulling force 500) acting on a safety device 30 being transmitted to the connector element detachable base interface 230 and acting on a connector element detachable base interface 230 in an at least partially outward direction away from the base attachment pin 130. In various embodiments, the magnitude of a threshold load force sufficient to cause the connector element detachable base interface 230 to detach from the base attachment pin 130 may vary based at least in part on the configuration (e.g., geometric features, relative dimensions, angular configurations) of the connector element detachable base interface 230 and/or the base attachment pin 130. In various embodiments, the connector element detachable base interface 230 may be configured such that a threshold load force of at least substantially between 0 lbf and 120 lbf (e.g., between 50 lbf and 90 lbf) acting on the connector element detachable base interface 230 may cause the connector element detachable base interface 230 to disengage the base attachment pin 130. For example, in various embodiments, the safety device connector apparatus 10 may be configured such that a pulling force of at least substantially between 0 lbf and 120 lbf (e.g., between 50 lbf and 90 lbf) acting on a safety device 30 attached to the safety device connector apparatus 10 may result in a threshold load force acting on the connector element 200 of the safety device connector apparatus 10 so as to reconfigure the connector element 200 from an engaged position to a disengaged position. For example, in the illustrated embodiment wherein the connector element 200 comprises a partially detachable arm element, as described herein, upon a threshold load force being realized at a connector element 200 (e.g., a connector element detachable base interface 230) in an engaged position, the connector element detachable base interface 230 may disengage from the base portion 100 (e.g., the base attachment pin 130 engaged therewith) so as to cause the connector element 200 to be reconfigured from an engaged position to a disengaged position, thereby providing a gap between the connector element detachable base interface 230 and the base attachment pin 130 that enables the safety device 30 previously attached to the safety device connector apparatus 10 (e.g., at the safety device attachment interface 300) when the connector element 200 was in an engaged position to be released from within the safety device attachment interface 300 through the gap between base attachment pin 130 and connector element detachable base interface 230.

In various embodiments, a connector element 200 may be predisposed to an engaged position based at least in part on one or more material properties thereof, such as, for example, an elastic limit of the connector element 200. For example, in various embodiments, at least a portion of a safety device connector apparatus 10, such as, for example, a connector element 200, may be defined at least in part by an elastic limit that enables a connection element 200 biased towards an engaged position to, upon being reconfigured from the engaged position to a disengaged position, exhibit an at least partially elastic deformation that causes the connection element 200 to be reconfigured from the disengaged position back to the engaged position. Further, in various embodiments, a connector element 200 may be defined at least in part by an elastic limit configured such that the connector element 200 exhibits at least partial plastic deformation upon executing one or more reconfiguration operations, as described herein. For example, in various embodiments, a collection element 200 may be predisposed to an engaged position based at least in part on a plastic deformation of at least a portion of the connection element 200. For example, in various embodiments, such an exemplary connector element 200 that utilizes a plastic deformation to enable a predisposition to an engaged position may be configured to facilitate retention of a base attachment pin 130 within a connector element detachable base interface 230

Figure 5B:
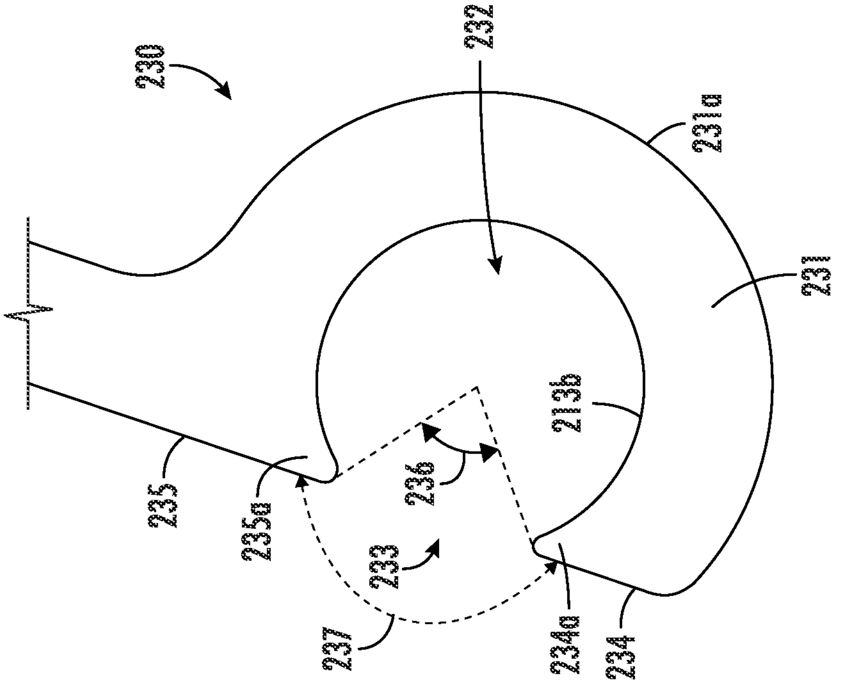
FIGS. 5A-5C illustrate various views of an exemplary safety device connector apparatus according to various embodiments described herein.
Figure 5A:
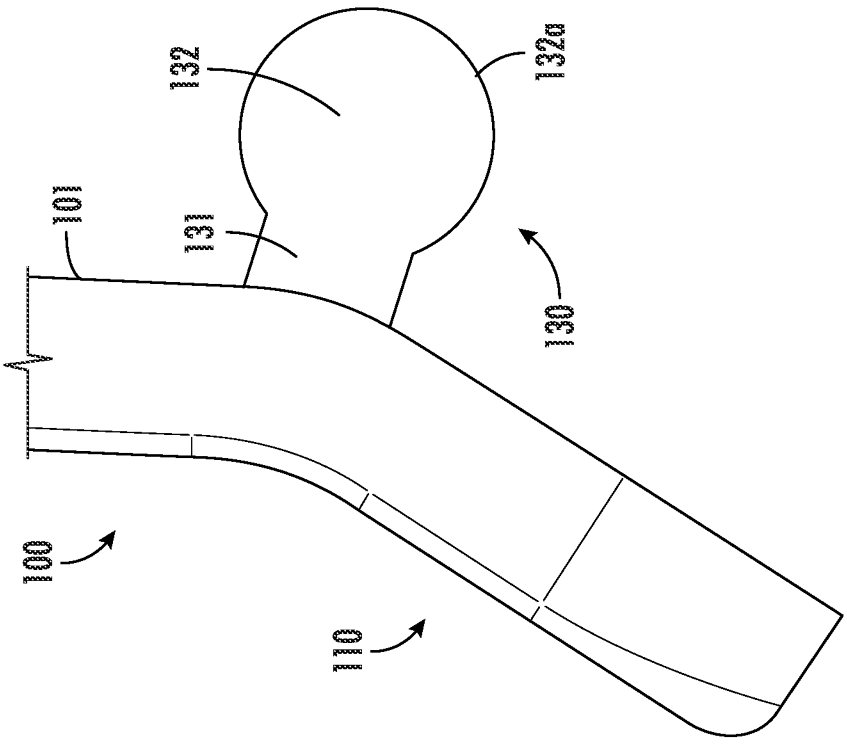
Figure 5C:
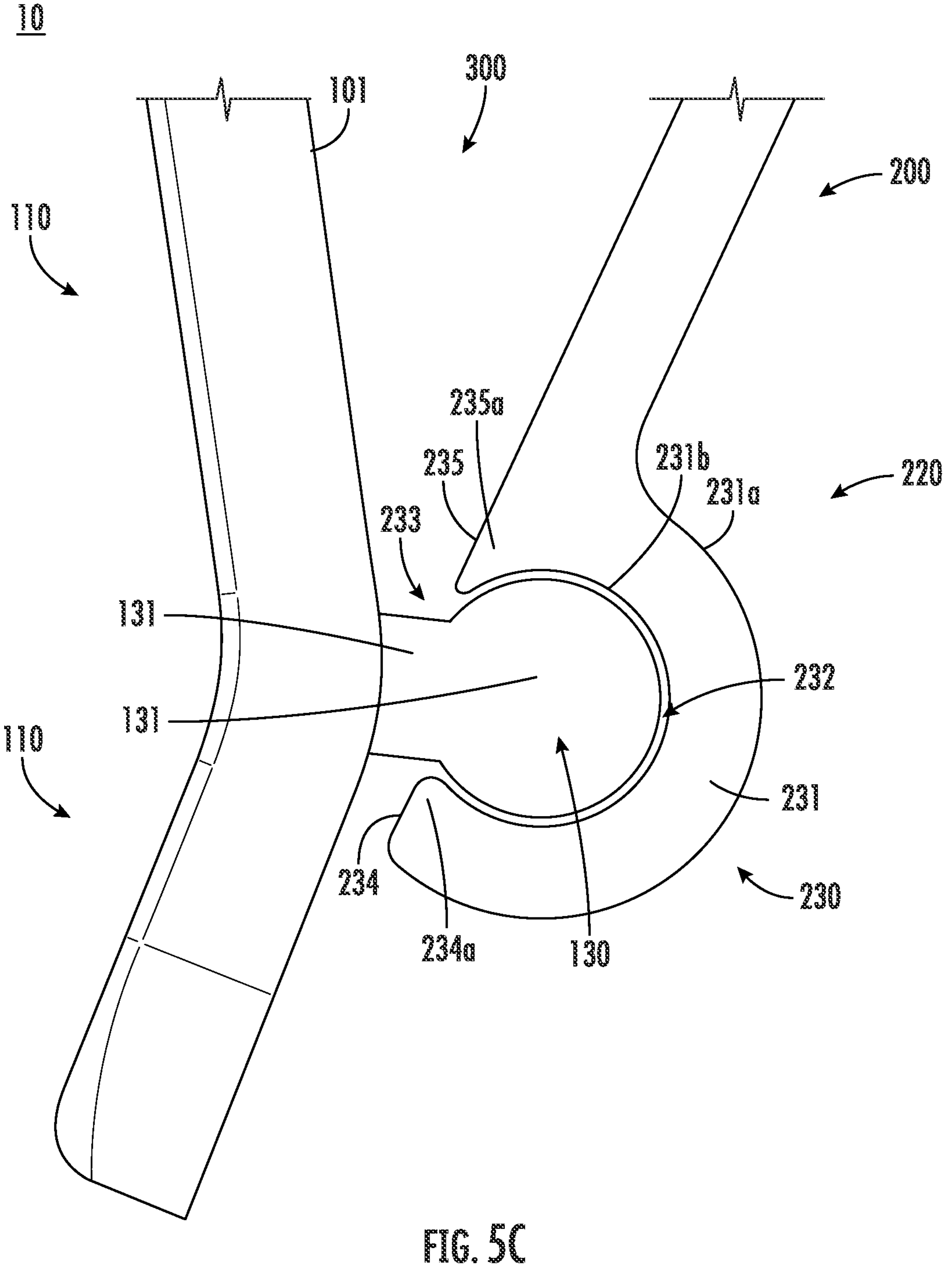

FIGS. 5A-5C illustrate cross-sectional views of various components of an exemplary safety device connector apparatus according to various embodiments. In particular, FIGS. 5A-5C illustrate isolated cross-sectional views of an exemplary base attachment pin 130 and an exemplary connector element detachable base interface 230, as well as an exemplary safety device connector apparatus 10 with an exemplary connector element 200 in an engaged position defined by an exemplary connector element detachable base interface 230 being coupled to an exemplary base attachment pin 130 of a base portion 100. As shown in FIG. 5A, in various embodiments, a base attachment element 130 of a base portion 100 may comprise a planar protrusion portion 131 extending away from surface 101 of the base portion 100 and a cylindrical pin portion 132 arranged at an outermost edge of the planar protrusion portion 131. In various embodiments, the planar protrusion portion 131 and the cylindrical pin portion 132 of the base attachment pin 130 may each extend along a width of the base portion 100 in a lateral direction. For example, a central axis of the cylindrical pin portion 132 may at least substantially parallel to the surface 101 and positioned an at least substantially perpendicular distance away from the surface 101 such that a connector element detachable base interface 230 may be secured to the base attachment pin 130 by at least partially surrounding at least a majority of an exterior surface (e.g., a circumference) of the cylindrical pin portion 132 without the surface 101 physically interfering with the engagement of the connector element detachable base interface 230 to the base attachment pin 130 (e.g., the cylindrical pin portion 132). In such an exemplary circumstance, the base attachment pin 130 may be configured such that a physical engagement of the connector element detachable base interface 230 and the base attachment pin 130 may be initiated by the connector element detachable base interface 230 physically abutting the cylindrical pin portion 132 of the base attachment pin 130.

As shown in FIG. 5B, in various embodiments, a connector element detachable base interface 230 of a connector element 200 may comprise one or more geometric features corresponding to the base attachment pin 130 such that the connector element detachable base interface 230 may be detachably coupled to the base attachment pin 130. As illustrated, in various embodiments the connector element detachable base interface 230 may be a fastening means (e.g., a female fastening means) comprising an at least partially tubular component defined by an at least partially cylindrical exterior sidewall 231 having a sidewall thickness extending radially between an exterior sidewall surface **231*a* and an interior sidewall surface 231*b*. In various embodiments, an at least partially cylindrical sidewall 231 of the connector element detachable base interface 230 may extend at least partially around a central axis so as to define a connector interface channel 232 embodying a hollow interior portion provided within an interior sidewall surface 231*b* of the cylindrical sidewall 231. For example, the connector element detachable base interface 230 may be arranged about the connector element 200 such that the central axis of the connector interface channel 232 extends in a lateral direction at least substantially parallel to the width of the base attachment pin 130 when the connector element 200 is provided in an engaged position. In various embodiments, the cross-sectional geometry of the interior channel of the connector element detachable base interface 230 may correspond at least in part to the cross-sectional geometry of the base attachment pin 130**.

In various embodiments, the connector element detachable base interface 230 may comprise a connector interface opening 233 extending through a thickness of the cylindrical sidewall 231. In various embodiments, the connector interface opening 233 may be configured to enable at least a portion of the base attachment pin 130 to extend therethrough so as to facilitate a fastening of the connector element detachable base interface 230 to the base attachment pin 130 in which the cylindrical pin portion 132 of the base attachment element 130 is secured within the connector interface channel 232. For example, the connector interface opening 233 may comprise an elongated opening (e.g., a slot) having a width that extends in a lateral direction along the width of the cylindrical sidewall 231 such that at least a portion (e.g., at least substantially all) of the width of a base attachment pin 130 may extend through the connector interface opening 233 and into the connector interface channel 232 of the connector element detachable base interface 230. Further, the connector interface opening 233 may comprise a height that extends along the at least a portion of the cylindrical sidewall 231 and may be defined in a radial direction about the central axis of the cylindrical sidewall 231 such that the height of the connector interface opening 233 may extend between a first connector interface opening end **234*a* and a second connector interface opening end 235*a*. For example, in various embodiments, the height of the connector interface orifice 233 extending along the cylindrical sidewall 231 between the first connector interface opening end 234***a* and the second connector interface opening end 235*a* may define an opening angle 236 of at least substantially between 50 degrees and 160 degrees (e.g., between 90 degrees and 130 degrees).

Further, in various embodiments, the connector interface opening 233 further comprises a notched configuration defined at least in part by one or more material recesses within the cylindrical sidewall 231 that may be provided at and/or at least substantially adjacent the connector interface opening 233 so as to at least partially adjust a configuration (e.g., angular configuration) of one or more surfaces of the connector interface opening 233 relative to the base attachment pin 130. For example, in various embodiments the notched configuration of the connector interface opening 233 may be defined at least in part by respective material recess at each of the first connector interface opening end surface 234 and the second connector interface opening end surface 235 so as to expand a notch angle 237. As illustrated, the notch angle 237 may comprise the angle (e.g., radial distance) between the first connector interface opening end surface 234 and the second connector interface opening end surface 235. In various embodiments, the connector element detachable base interface 230 may comprise a "V"-shaped notch configuration that may be defined at least in part by a notch angle 237 that is at least substantially greater than the opening angle 236. For example, in various embodiments, the notch angle 237 of the connector element detachable base interface 230 (e.g., the connector interface opening 233) defined between the first connector interface opening end surface 234 and the second connector interface opening end surface 235 may be at least substantially between 50 degrees and 160 degrees (e.g., between 90 degrees and 130 degrees). For example, the "V"-shaped notch (e.g., notch angle 237) of the connector interface opening 233 may be configured to minimize physical interference between the cylindrical sidewall 231 of the connector element detachable base interface 230 and the cylindrical pin portion 132 of the base attachment pin 130 in order to facilitate ease of engagement and detachment between the connector element detachable base interface 230 and the base attachment pin 130.

As illustrated in FIG. 5C, the connector element detachable base interface 230 of a connection element 200 may be configured to receive at least a portion of a base attachment pin 130 (e.g., cylindrical pin portion 132) within a connector interface channel 232 via the connector interface opening 233 so as to secure the base attachment pin 130 within the connector interface channel 232. For example, in various embodiments, the configuration of at least a portion of the connector element detachable base interface 230 (e.g., the cylindrical sidewall 231, the connector interface channel 232) may be at least substantially similar (e.g., proportional) to the configuration of the cylindrical pin portion 132 such that the connector element detachable base interface 230 may minimize the movement of the cylindrical pin portion 132 within the connector interface channel 232 when the connector element 200 is in an engaged position. The connector element detachable base interface 230 may utilize the interior sidewall surface 231*b* of the cylindrical sidewall 231*a* physical constraint to retain the cylindrical pin portion 132 in a secured configuration by at least partially restricting the range of motion of the cylindrical pin portion 132 within the connector interface channel 232 in one or more directions. As illustrated, when the base attachment element 130 is disposed within the connector interface channel 232, the cylindrical sidewall 231 (e.g., the interior sidewall surface 231*b*) may be configured to extend along at least a majority of the perimeter surface of the cylindrical pin portion 132 so as to at least partially surround the cylindrical pin portion 132. For example, the connector element detachable base interface 230 may embody a linear socket element within which the base attachment pin 130 may be secured. For example, the connector element detachable base interface 230 may be configured such that, when the connection element 200 is arranged in an engaged position, at least a portion of the cylindrical sidewall 231 may be disposed between the cylindrical pin portion 132 and the surface 101 of the base portion 100. In such an exemplary configuration, at least the portions of the cylindrical sidewall 231 positioned between the cylindrical pin portion 132 and the surface 101 may function as physical obstructions to prevent the cylindrical pin portion 132 from being extracted from within the connector interface channel 232 through the connector interface opening 233 by a force that is smaller than the threshold load force, as described herein.

In various embodiments, the connector interface opening 233 may be defined at least in part by a linear opening distance corresponding to a linear height of the connector interface opening 233. For example, as illustrated, the linear height of the connector interface opening 233 may be defined by the linear distance between first connector interface opening end 234*a* and second connector interface opening end 235*a*. In various embodiments, the linear opening distance of the connector interface opening 233 may be at least substantially smaller than a diameter of the cylindrical pin portion 132 of the base attachment pin 130. In such an exemplary circumstance wherein the connector element 200 is in a disengaged position, one or more forces may be applied to the base portion 100 and/or the connector element detachable base interface 230 in order to cause the base attachment pin 130 (e.g., cylindrical pin portion 132) to be pushed through the connector interface opening 233 and into the connector interface channel 232. The cylindrical pin portion 132 may be pushed against one or more surfaces of the cylindrical sidewall 231 that are positioned at least substantially adjacent the connector interface opening 233, such as, for example, an exterior sidewall surface 231*a*, a first connector interface opening end surface 234, and a second connector interface opening end surface 235. In various embodiments, at least a portion of the cylindrical sidewall 231 may comprise an at least partially elastic configuration wherein the at least a portion of the cylindrical sidewall 231 may exhibit an elastic deformation in response to a force being applied thereto by the base attachment pin 130 so as to enable the cylindrical pin portion 132 to pass through the connector interface opening 233 (e.g., between an engaged position and a disengaged position). Further, as described herein, the connector interface opening 233 may comprise an angled notch configuration configured to facilitate a movement of at least a portion of the base attachment pin 130 relative to the connector interface opening 233. For example, the angled notch configuration may be configured to at least substantially reduce the magnitude of the resistance forces acting on the cylindrical pin portion 132 from the cylindrical sidewall 231 in response to the cylindrical pin portion 132 being engaged with the cylindrical sidewall 231 and the connector interface opening 233 and pushed towards the connector interface channel 232. The angled notch configuration may be defined at least in part by a notch angle comprising the angle (e.g., radial distance) between the first connector interface opening end surface 234 and the second connector interface opening end surface 235. For example, in various embodiments, the angled notch configuration may comprise a "V"-shaped notch configured such that the such that the surfaces of the cylindrical sidewall 231 and/or the connector interface opening 233 that are engaged by the cylindrical pin portion 132 as it is pushed towards the connector interface channel 232, such as, for example, the first connector interface opening end surface 234 and the second connector interface opening end surface 235, may comprise an angular configuration relative to the direction of motion of the cylindrical pin portion 132 as the base attachment pin 130 is reconfigured toward the engaged position within the connector interface channel 132.

Figure 6:
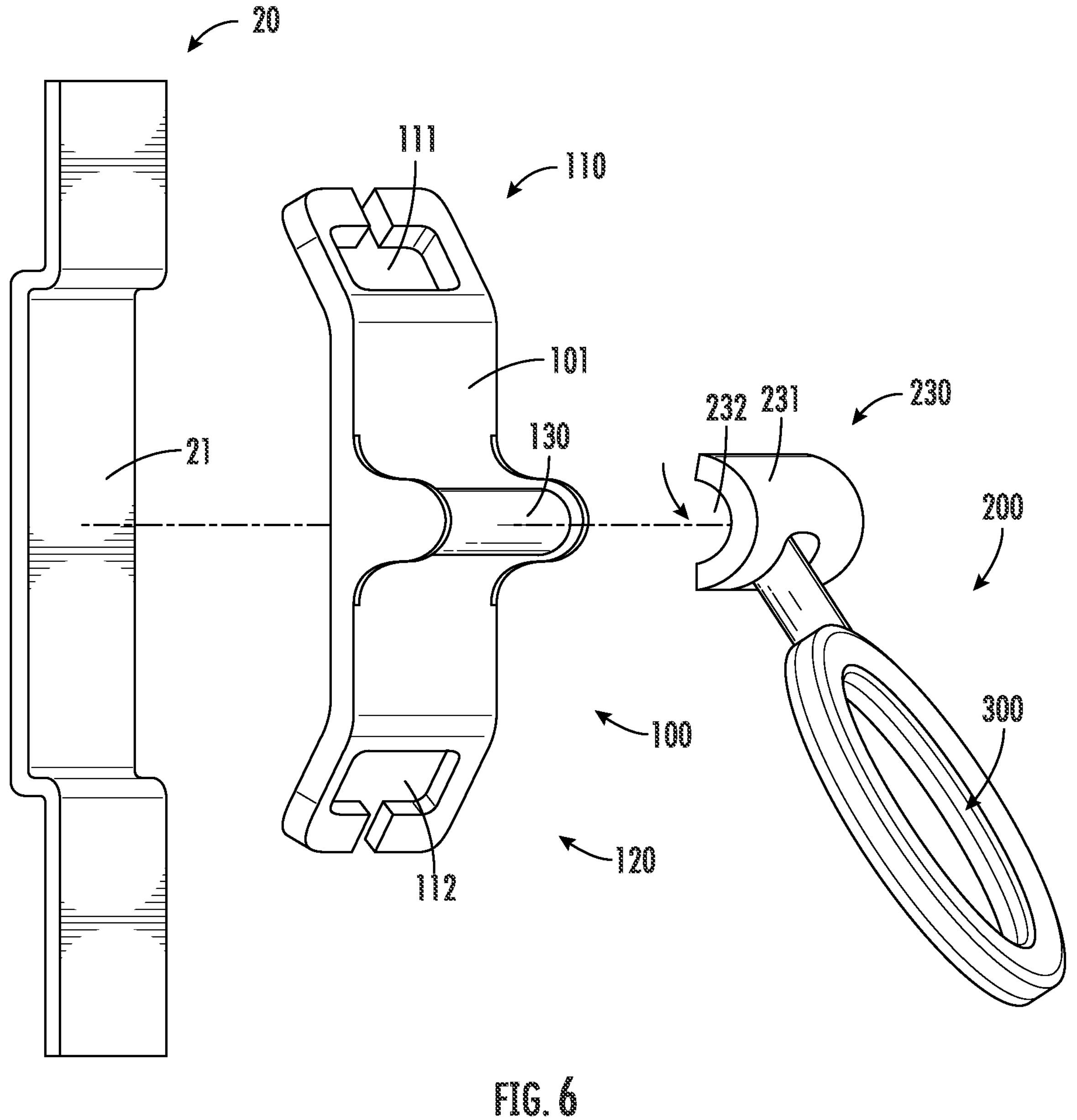
FIG. 6 illustrates an exploded perspective view of an exemplary safety device connector apparatus according to an example embodiment described herein.

FIG. 6 illustrates an exploded perspective view of an exemplary safety device connector apparatus according to an example embodiment described herein. An exemplary safety device connection apparatus may comprise a base portion 100 configured to be secured relative to one or more straps 21 of a wearable harness 20. As illustrated, an example base portion 100 may comprise a plurality of base openings, including a first base opening 111 arranged at least substantially adjacent a first base end 110 and a second base opening 112 arranged at an opposing end of the length of the base portion 100 at least substantially adjacent the second base end 120, each of which may be configured to receive at least a portion of a strap 21 therethrough. In various embodiments, the base portion 100 may comprise a base attachment pin 130 comprising an at least substantially linear rod element rigidly secured between two lateral support arms positioned at opposing lateral sides of the base portion 100. As illustrated, the lateral support arms may extend in an outward direction away from a respective lateral side of a base surface 101 of the base portion 100, such that the base attachment pin 130 extends in a lateral direction between the lateral support arms along at least a portion of the width of the base portion 100. The base attachment pin 130 may be arranged between the lateral support arms such that the base attachment pin 130 extends laterally along a central portion of base portion 100, as measured in a longitudinal direction along a height of the base portion 100, and is positioned at a distance away from the base surface 101 of the base portion 100.

As illustrated, an exemplary safety device connector apparatus may comprise a connector element 200 comprising a fully detachable configuration relative to the base portion 100, such that the connector element 200 may be configurable between an engaged position in which a connector element detachable base interface 230 of the connector element 200 is engaged with the base attachment pin 130 of the base portion, and a disengaged position in which the connector element 200 is fully detached from the base portion 100 such that no portion of the connector element 200 is engaged with the base portion 100. For example, the safety device connector apparatus 10 may comprise a connector element 200 that is configurable between an engaged position and a disengaged position based at least in part on the detachable configuration of at least a portion of a connector element 200 relative to the base portion 100. An exemplary connector element 200 may define a safety device attachment interface 300 at which the connector element 200 may be engaged by a safety device, as described herein, and a connector element detachable base interface 230 configured to engage the base portion 100 (e.g., the base attachment pin 130) so as to detachably couple the connector element 200 relative to the base portion 100. As illustrated, the safety device attachment interface 300 may comprise a ring element configured to be engaged by a corresponding fastening means of a safety device 30, such as, for example, a hook, in order to operatively couple the safety device to a wearable harness (e.g., via the safety device connector apparatus 10 secured to strap 21). Further, as shown, the connector element 200 and the base portion 100 may comprise distinct components configured to be selectively detachably couplable relative to one another at a single interface defined by the engagement of the connector element detachable base interface 230 with the base attachment pin 130. For example, the exemplary connector element detachable base interface 230 illustrated in FIGS. 6-7B may comprise a configuration that is at least substantially similar to the 230 described herein in reference to FIG. 5B. For example, 230 may comprise a cylindrical sidewall 231, a connector interface channel 232, and a connector interface opening 233, and may further comprise an angled notch configuration defined at least in part by a "V"-shaped notch provided at the connector interface opening 233 in order to facilitate ease of use as the connector element 200 is reconfigured from a disengaged position to an engaged position, as described in further detail herein.

Figure 7B:
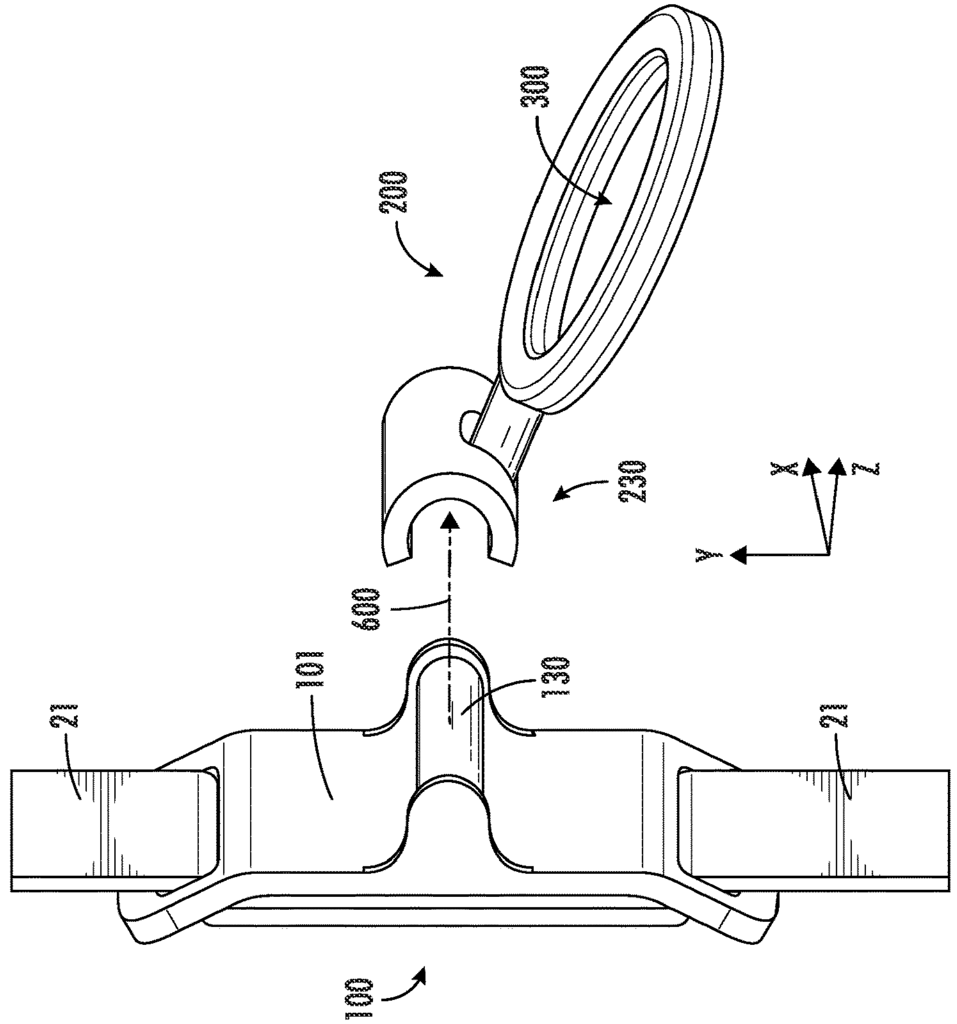
FIGS. 7A-7B illustrates various views of an exemplary safety device connector apparatus according to various embodiments described herein.
Figure 7A:
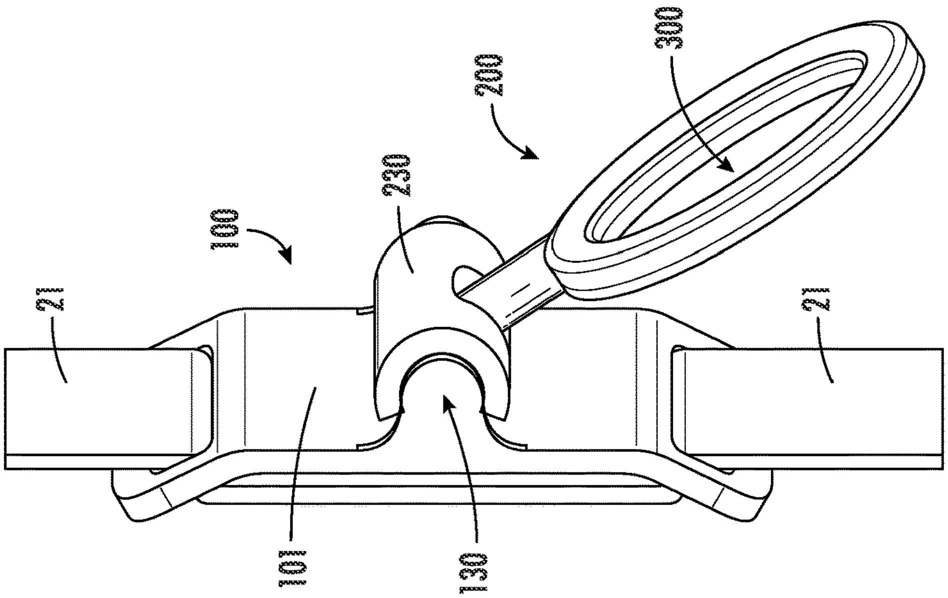

As described herein, a safety device connector apparatus 10 may comprise a connector element 200 that is configurable between an engaged position and a disengaged position based at least in part on the detachable configuration of at least a portion of a connector element 200 relative to the base portion 100. FIGS. 7A and 7B illustrate a perspective views of exemplary safety device connector apparatuses according to various embodiments described herein. In particular, FIG. 7A illustrates an exemplary safety device connector apparatus 10 comprising a connector element 200 configured in an engaged position. For example, in various embodiments, an engaged position may be defined by a configuration wherein the connector element 200 is secured relative to the base portion 100 such that a safety device attached to the connector element 200 (e.g., via the safety device attachment interface 300) may be retained in an installed configuration relative to a wearable harness. As illustrated in FIG. 7A, an engaged position of a connector element 200 may be defined at least in part by the connector element detachable base interface 230 being coupled to the base attachment pin 130 such that the connector element 200 is hingedly connected to the base portion 100 about the base attachment pin 130. For example, in such an exemplary circumstance, the connector element detachable base interface 230 may be coupled to the base attachment pin 130 via a hinged connection such that the connector element 200 provided in an engaged position may be configured to rotate about a central axis of the base attachment pin 130 relative to the base portion 100. Such an exemplary configuration may enable an at least partially flexible configuration wherein at least a portion of a safety device attached to a safety device attachment interface 300 of the connector element 200 may rotate along a range of rotational motion relative to the base plate 100 so as to at least substantially minimize the mechanical strain acting on the safety device connector apparatus 100 (e.g., via the safety device) as a result of user positioning and/or mobility.

FIG. 7B illustrates an exemplary safety device connector apparatus 10 comprising a connector element 200 configured in a disengaged position upon being reconfigured from an engaged position as a result of a load force that is caused by a pulling force acting on a safety device attached to the safety device attachment interface 300 of the connector element 200 and acts on the connector element 200. In various embodiments, a pulling force, such as, for example, a pulling force 600, that is generated by the wearable harness and/or the safety device 30 upon experiencing a fall condition, as described herein, may act (e.g., pull) on a portion of a safety device secured within the safety device attachment interface 300 of the safety device connector element 10 in an at least partially outward direction away from the base attachment pin 130 of the safety device connector element 10 (e.g., in a positive-z direction relative to the orientation of FIG. 7B). In such an exemplary circumstance, a pulling force 600 may cause the at least a portion of the safety device 30 to be pulled against the safety device attachment interface 300 of the connector element 200 such that at least a portion of the pulling force 600 may be transmitted to the connector element 200 and realized at the connector element detachable base interface 230. In various embodiments, the at least a portion of the pulling force 600 transmitted to the connector element detachable base interface 230 may act on the connector element detachable base interface 230 in an at least partially outward direction away from the base attachment pin 130 so as to cause the connector element detachable base interface 230 to detach from the base attachment pin 130 such that the connector element 200 is reconfigured from the engaged position to a disengaged position. As described herein, the connector element 200 may be configured to at least partially detach from the base portion 100 so as to be reconfigured to a disengaged position in response to a threshold load force acting on the connector element 200 (e.g., on a connector element detachable base interface 230) in an at least partially outward direction away from the base attachment pin 130. As illustrated in FIG. 7B, a connector element 200 may be fully detachable from the base portion 100 such that no portion of the connector element 200 is engaged with the base portion 100 when the connector element 200 is provided in a disengaged position, Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A safety device connector apparatus for use with a wearable safety harness, the safety device connector apparatus comprising:

a base portion operable to attach to one or more straps of the wearable safety harness through one or more base openings extending through a thickness of the base portion, the base portion comprising a base attachment pin fixedly secured thereto; and a connector element configured to be detachably coupled to the base portion via a connector element detachable base interface configured to engage the base attachment pin, wherein the connector element detachable base interface comprises a connector interface opening, and wherein engaging the base attachment pin comprises receiving at least a portion of the base attachment pin within the connector interface opening;

wherein the connector interface opening comprises an angled notch configuration configured to facilitate a movement of at least a portion of the base attachment pin relative to the connector interface opening; and wherein at least a portion of the connector element is configured to detach from the base portion based at least in part on a load force acting on at least a portion of the connector element.

2. The safety device connector apparatus of claim 1, wherein the angled notch configuration of the connector interface opening comprises a "V"-shaped notch.

3. The safety device connector apparatus of claim 1, wherein the connector element is configured to fully detach from the base portion based at least in part on the load force acting on the at least a portion of the connector element.

4. The safety device connector apparatus of claim 1, wherein the connector element comprises a first connector element portion fixedly secured to the base portion and a second connector element portion configured to detach from the base portion based at least in part on the load force acting on the at least a portion of the connector element.

5. The safety device connector apparatus of claim 1, wherein the connector element detachable base interface is coupled to the base attachment pin via a hinged connection such that the connector element is configured to rotate about a central axis of the base attachment pin relative to the base portion.

6. The safety device connector apparatus of claim 1, wherein the at least a portion of the connector element detaching from the base portion comprises the connector element detachable base interface disengaging the base attachment pin; wherein a reconfiguration of the connector element from an engaged position to a disengaged position is defined at least in part by the connector element detachable base interface disengaging the base attachment pin.

7. The safety device connector apparatus of claim 1, wherein the connector element is predisposed to being arranged in an engaged position wherein the connector element detachable base interface is engaged with the base attachment pin.

8. The safety device connector apparatus of claim 1, wherein the angled notch configuration of the connector interface opening is defined at least in part by a notch angle that is larger than a connector interface opening angle defined at least in part by a radial height of the connector interface opening.

9. The safety device connector apparatus of claim 1, wherein the connector element detachable base interface comprises cylindrical sidewall extending along a central axis so as to at least partially surround a connector interface channel defined within the cylindrical sidewall; wherein the connector interface opening extends through a thickness of the cylindrical sidewall such that the connector element detachable base interface is configured to receive at least a portion of the base attachment pin within the connector interface channel via the connector interface opening.

10. The safety device connector apparatus of claim 1, wherein the connector interface opening is defined at least in part by a linear opening distance corresponding to a linear height of the connector interface opening; wherein the linear opening distance of the connector interface opening is at least substantially less than a corresponding linear height of the base attachment pin.

* * * * *